(12) United States Patent
Krupinski

(10) Patent No.: US 6,452,487 B1
(45) Date of Patent: Sep. 17, 2002

(54) SYSTEM AND METHOD FOR WARNING OF A TIP OVER CONDITION IN A TRACTOR TRAILER OR TANKER

(76) Inventor: Stanley Krupinski, 601 Jackson St., Lansdale, PA (US) 19446

( * ) Notice: Subject to any disclaimer, the term of this patent is extended or adjusted under 35 U.S.C. 154(b) by 0 days.

(21) Appl. No.: 09/503,466

(22) Filed: Feb. 14, 2000

(51) Int. Cl.[7] .............................. B60Q 1/00; G08B 21/00
(52) U.S. Cl. ....................... 340/440; 340/429; 340/431; 340/666; 340/689; 180/41; 180/290; 200/61.45 R; 200/61.52
(58) Field of Search ................................. 340/440, 431, 340/429, 665, 666, 689; 180/290, 41; 177/45, 46; 200/61.45 R, 61.52

(56) References Cited

U.S. PATENT DOCUMENTS

| | | | |
|---|---|---|---|
| 3,464,755 A | 9/1969 | Brown | 298/22 |
| 3,640,578 A | 2/1972 | Finney | 298/178 |
| 4,988,974 A | 1/1991 | Fury | 340/431 |
| 5,032,821 A | * 7/1991 | Domanico et al. | 340/440 |
| 5,825,284 A | * 10/1998 | Dunwoody et al. | 340/440 |
| 6,157,295 A | * 12/2000 | Steiner et al. | 340/440 |
| 6,262,658 B1 | * 7/2001 | O'Connor | 340/440 |

* cited by examiner

Primary Examiner—Donnie L. Crosland
(74) Attorney, Agent, or Firm—LaMorte & Associates, P.C.

(57) ABSTRACT

A system and method for warning of a tip over condition in a motor vehicle, such as a tractor trailer, that is carrying a cargo load. The system includes at least one left side sensor for sensing a proportion of the cargo load carried on the left side of the motor vehicle's cargo section. Similarly, at least one right side sensor is provided for sensing a proportion of the cargo load carried on the right side of the motor vehicle's cargo section. A microprocessor is coupled to both the left side sensors and the right side sensors. The microprocessor calculates a ratio of the cargo load borne by the left side of the motor vehicle and the right side of the motor vehicle. An alarm is provided that is coupled to the microprocessor. The microprocessor sounds an alarm when the calculated ratio exceeds a predetermined threshold value, thus indicating a potential tip over condition.

11 Claims, 5 Drawing Sheets

SYSTEM AND METHOD FOR WARNING OF A TIP OVER CONDITION IN A TRACTOR TRAILER OR TANKER

BACKGROUND OF THE INVENTION

1. Field of the Invention

In general, the present invention relates to systems and methods that are used to provide a warning to the drivers of large trucks that the current driving conditions and truck load conditions may cause the truck to tip over if not corrected.

2. Description of the Prior Art

Tractor trailer trucks are used to transport a countless number of products from point to point along the roads. Different products are packed in a variety of ways within the confines of a tractor trailer. For example, goods are often simply stacked within the trailer. Other times goods are hung from supports within the trailer. Still other times, goods are packed on pallets and the pallets are stacked in the tractor trailer.

As a tractor trailer drives from point to point, the cargo within the tractor trailer experiences many different forces. As a tractor trailer accelerates and decelerates, the cargo is biased backward and forward, respectively, within the trailer. As the tractor trailer drives over potholes and uneven pavement, the cargo is shaken. Similarly, as a tractor trailer moves around curves, the resulting centrifugal forces cause the cargo to be biased from side to side.

When a tractor trailer or other large truck is loaded, the cargo is placed in the trailer in a manner that distributes the weight of the cargo evenly. In this manner, the center of gravity associated with the trailer is not significantly changed. Furthermore, the weight is evenly distributed across the wheels of the trailer, which makes the suspension and the brakes of the trailer work more efficiently.

However, due to the forces that are experienced by the cargo in a trailer, it is not uncommon for cargo to shift within the confines of the tractor's trailer. When the cargo shifts, the center of gravity associated with the tractor's trailer also shifts. If a driver is not aware of the shifted cargo and the new center of gravity of the load, the driver may turn the tractor trailer too sharply and cause the trailer to tip over. Similarly, if the cargo shifts in the middle of a turn, the sudden change in the trailer's center of gravity may cause the otherwise safe turn to result in the trailer tipping over.

Tractor trailers that are carrying hanging loads and tanker trucks that carry liquid loads have variable centers of gravity because such cargo loads shift constantly. Normally, the drivers of such trucks are aware of the shifting load and compensate accordingly. However, such loads often shift with more force than is anticipated and dramatically change the center of gravity for the load. If such an unanticipated shift occurs, it can cause a simple maneuver to result in the load tipping over.

Tractor trailer drivers often rely upon experience in handling driving situations where a cargo load shifts. However, experience is not always enough. If load shifts, a driver may not realize that fact until the truck is being driven into a sharp turn. At this point, it may be too late and the truck may tip over.

In the prior art, there have been different systems created to help drivers realize that the loads they are carrying are in danger of tipping over. However, such systems are typically confined to dump trucks that elevate their loads in order to dump the load. Such prior art systems are exemplified by U.S. Pat. No. 4,988,974 to Fury, entitled Warning And Safety System Indicating Truck Trailer Tip-Over Condition and U.S. Pat. No. 3,640,578 to Finney, entitled Leveling System For Semi End Dump Trucks. Such systems are used when the truck is at a full stop and a load is being dumped. Such systems cannot be used to dynamically monitor the stability of a truck load as the truck is in motion.

A need therefore exits for a system and associated method that can be adapted for use on tractor trailers and tankers that monitor the condition of the cargo load while the truck is in motion and warns of conditions that may result in a tip-over. This need is met by the present invention as is described and claimed below.

SUMMARY OF THE INVENTION

The present invention is a system and method for warning of a tip over condition in a motor vehicle, such as a tractor trailer, that is carrying a cargo load. The system can be built into the motor vehicle or added to the motor vehicle as needed. The system includes at least one left side sensor for sensing a proportion of the cargo load carried on the left side of the motor vehicle's cargo section. Similarly, at least one right side sensor is provided for sensing a proportion of the cargo load carried on the right side of the motor vehicle's cargo section. A microprocessor is coupled to both the left side sensors and the right side sensors. The microprocessor calculates a ratio of the cargo load borne by the left side of the motor vehicle and the right side of the motor vehicle. An alarm is provided that is coupled to the microprocessor. The microprocessor sounds an alarm when the calculated ratio or the rate of change in the calculated ratio exceeds a predetermined threshold value, thus indicating a potential tip over condition.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Although the present invention system and method can be adapted for use in any truck that carries a load, such as a four wheeled truck, a six wheeled truck, a ten wheeled truck or the like, the present invention is especially well suited for use with eighteen wheeled tractor trailers. Accordingly, by way of example, the present invention will be described as applied to a tractor trailer in order to set forth the best mode contemplated for the invention.

Figure 1:
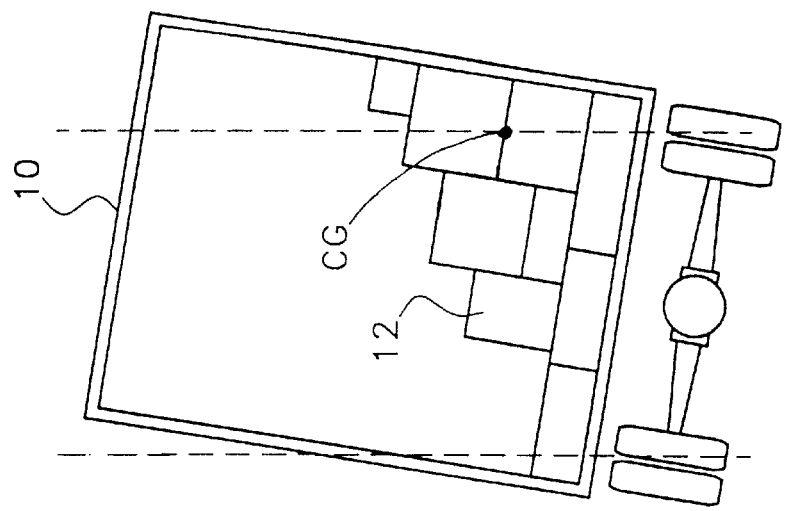
FIG. 1 is a rear view of a tractor trailer's trailer loaded with a balanced cargo load.

Referring to FIG. 1, the rear of a trailer 10 from a tractor trailer is shown. In the trailer 10 is a cargo load 12 that has been evenly distributed. As such, the center of gravity $C_G$ of the combined trailer 10 and cargo load 12 remains proximate the center of the trailer 10. At the sides of the trailer 10 are shown two imaginary lines $I_1$, $I_2$ that pass through the center of the left and right sets of tires that support the trailer 10. The imaginary lines $I_1$, $I_2$ represent the critical planes for the tipping of the trailer 10. A trailer 10 will remain stable and will not tip over for as long as the center of gravity $C_G$ remains within these imaginary lines $I_1$, $I_2$. However, if the center of gravity $C_G$ were to pass over one of the imaginary lines $I_1$, $I_2$, the trailer 10 would become unstable and gravity will cause the trailer 10 to tip.

Since the cargo load 12 in the trailer 10 is evenly distributed, the weight experienced by the left side tire sets and the right side tire sets are essentially equal. As a result, the left side suspension and the right side suspension are stressed to the same degree and the trailer 10 remains level.

Figure 2:
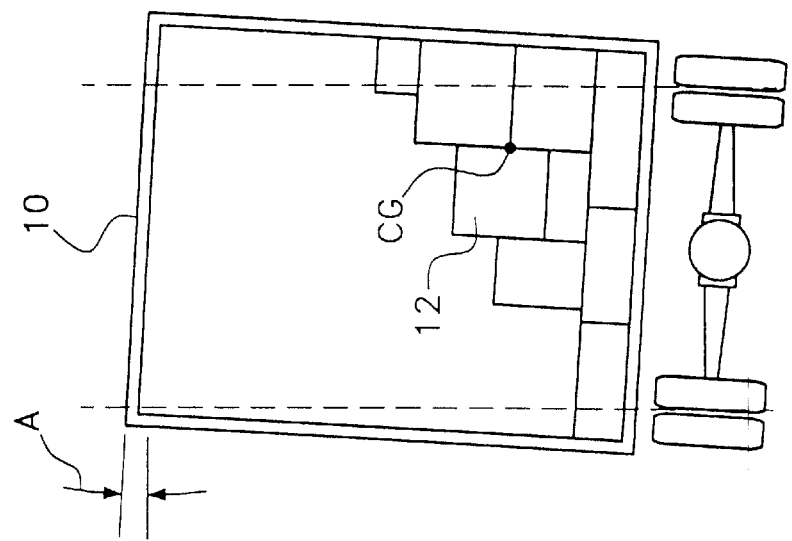
FIG. 2 is a rear view of a tractor trailer's trailer loaded with a cargo load that has shifted.

Referring to FIG. 2, it can be seen that the cargo load 12 in a trailer 10 has shifted to one side of the trailer 10 as the trailer rides along the road. As the cargo load 12 shifts, the center of gravity $C_G$ from the combined trailer 10 and cargo load 12 also shifts. Since the cargo load 12 is no longer evenly distributed, the weight on some of the trailer suspension elements is greater than the weight of other suspension elements. Consequently, the left side sets of wheels support less weight than do the right side sets of wheels. Depending on the weight of the cargo load 12, the uneven distribution may cause a slight tilt (Angle A) in the trailer 10 that is not noticed by the driver. Furthermore, when the truck driver applies the brakes to the trailer, the brakes may not respond evenly due to the different weights being supported by the different sets of wheels.

Figure 3:
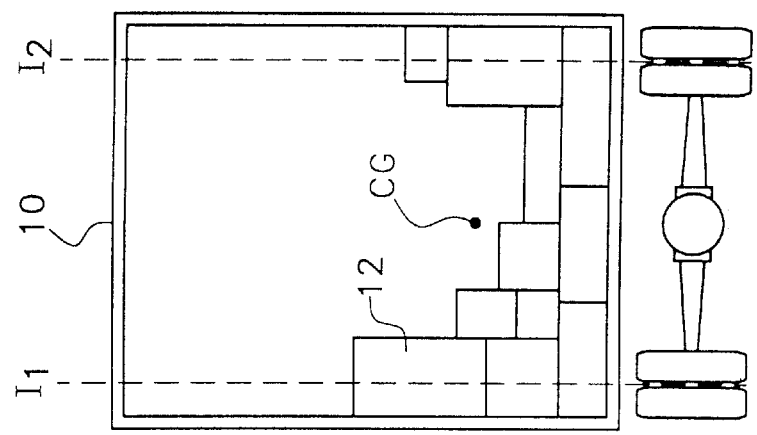
FIG. 3 is a rear view of a tractor trailer's trailer loaded with a cargo load that is on the verge of tipping over.

Referring to FIG. 3, it can be seen that once the cargo load 12 becomes uneven and the trailer 10 is brought into a turn, the centrifugal force created by the turn may cause the center of gravity $C_G$ to pass beyond the critical plane of safety, shown by the imaginary line $I_2$. Once the center of gravity $C_G$ passes the critical plane, gravity acts to tip over the trailer 10 rather than set the trailer straight. At this point, the trailer 10 is doomed to tip over. The weight on the left side set of wheels rapidly decreases as the left side set of wheels are lifted off the ground.

Figure 4:
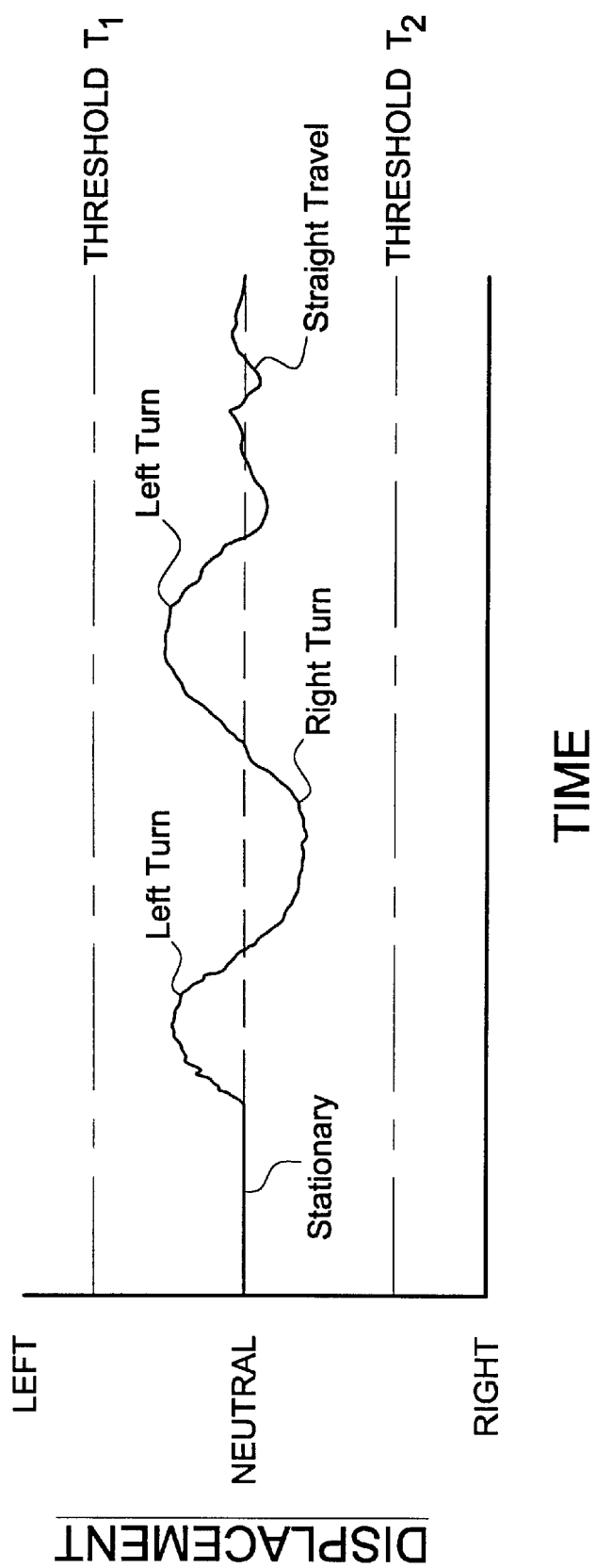
FIG. 4 is a graph that plots left/right weight distribution verses time for a balanced load, such as that shown in FIG. 1.

Referring back to FIG. 1, it will be understood that since the cargo load 12 is distributed, the suspension elements experience the same degree of stress as the trailer moves. Referring to FIG. 4, there is shown a graph that plots left and right weight distribution against time. As can be seen, when the trailer 10 (FIG. 1) is at rest, the left/right weight distribution is even. As the trailer begins to move, the weight distribution may shift from left to right as the trailer makes left and right turns. However, the weight distribution averages zero and never surpasses threshold levels, as indicated by lines $T_1$ and $T_2$. In the graph, the average slope of the graph represents the rate of change for the weight. The rate of change is mild and averages zero for any substantial period of time.

Figure 5:
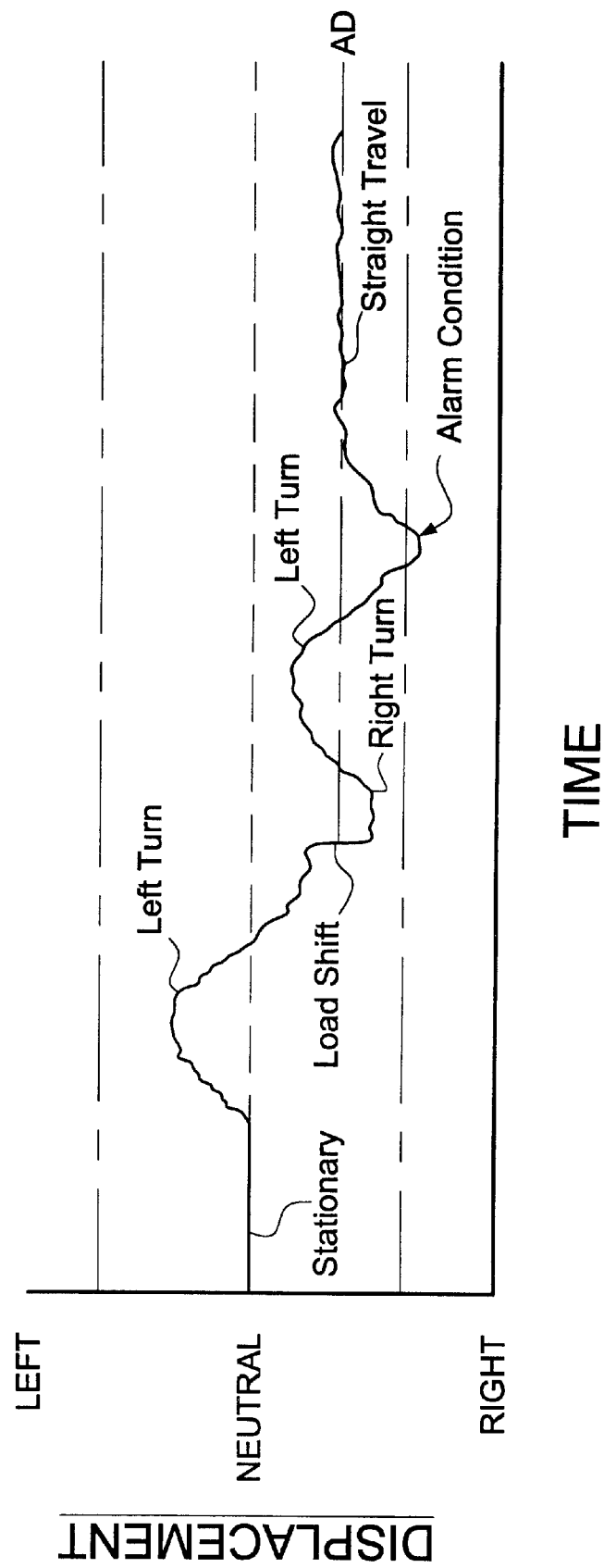
FIG. 5 is a graph that plots left/right weight distribution verses time for a shifted cargo load, such as that shown in FIG. 2.

Referring back to FIG. 2, a situation has occurred where the cargo load 12 in the trailer 10 has shifted. Referring to FIG. 5, a graph of weight distribution verses time is shown for this situation. From the graph, it can be seen that when the cargo load 12 (FIG. 2) shifts, the average weight distribution moves away from zero. As the trailer makes turns, the weight distribution surpasses one of the acceptable threshold levels $T_1$ or $T_2$. As will later be explained, if the weight distribution does surpass one of the acceptable threshold levels $T_1$ or $T_2$, an alarm is sounded.

Furthermore, as can be seen from FIG. 5, once a cargo load has shifted, the weight distribution between the left side of the trailer and the right side of the trailer is not even. As such, the average weight distribution AD is not zero. If an average weight distribution AD varies away from zero by more than a predetermined amount, an alarm is sounded. The alarm informs the driver that the cargo load in the trailer has shifted by more than an acceptable level.

Figure 6:
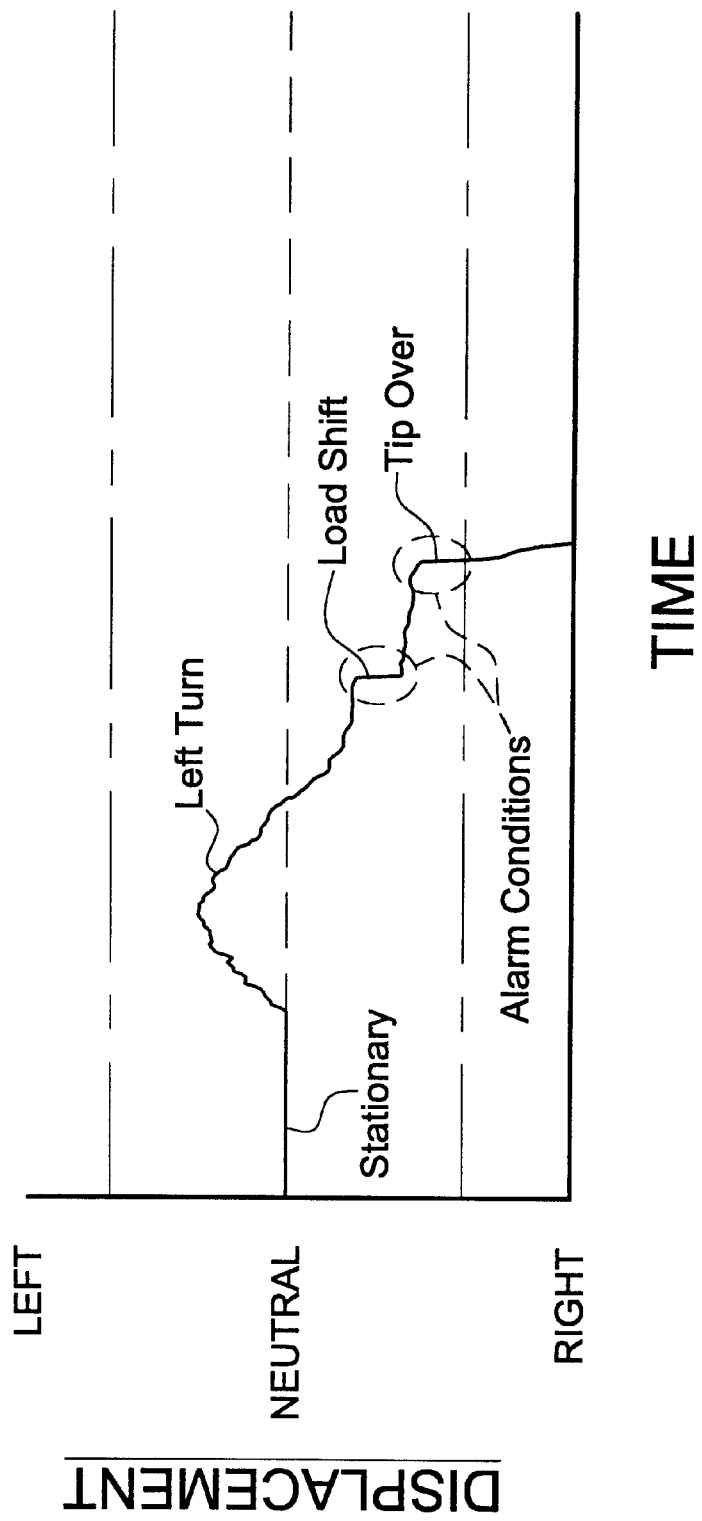
FIG. 6 is a graph that plots left/right weight distribution verses time for a shifted cargo load that is on the verge of tipping over, such as that shown in FIG. 3.

Referring back to FIG. 3, a situation has occurred where the cargo load 12 in the trailer 10 has shifted and the truck is being driven in an unsafe manner. Referring to FIG. 6, a graph of weight distribution verses time is shown for this situation. From the graph, it can be seen that when the trailer is in danger of tipping, the rate of change ΔW increases sharply. As has been previously stated, the rate of change ΔW is equal to the slope of the graph line. If the rate of change ΔW per a unit of time surpasses a predetermined threshold, then an alarm is sounded. When represented mathematically:

$$\frac{\Delta W}{\Delta T}$$

>Threshold→Alarm where ΔW is the change in the average mean slope and ΔT is a period of time at least as long as one second.

From the above, it will be understood that three conditions can sound the alarm. The first condition is when the differential of the load distribution between the left side and the right side of a trailer surpasses a threshold. The second condition is when the average left/right load distribution varies from zero. The third condition is when the rate of change ΔW in the load distribution, per unit time, surpasses a threshold.

The threshold values for the various alarm conditions can be varied depending upon driving conditions. In the graphs of FIG. 4, FIG. 5, and FIG. 6, the threshold values are set assuming that the trailer is travelling upon a flat road. Thus the trailer would tend to stand straight. However, roads are rarely perfectly flat. Many roads tend to be sloped. Using a level sensor, adjustments in the threshold levels and the median graph value can be adjusted to compensate for the uneven road conditions.

Similarly, the speed at which a trailer is traveling directly effects the likelihood that the trailer will tip over. As such, by using a speed sensor, the alarm threshold values can be tightened in proportion to the speed of the trailer. As a result, turns at high speeds may sound a tip alarm, however that same turn at a lower speed may not.

Figure 7:
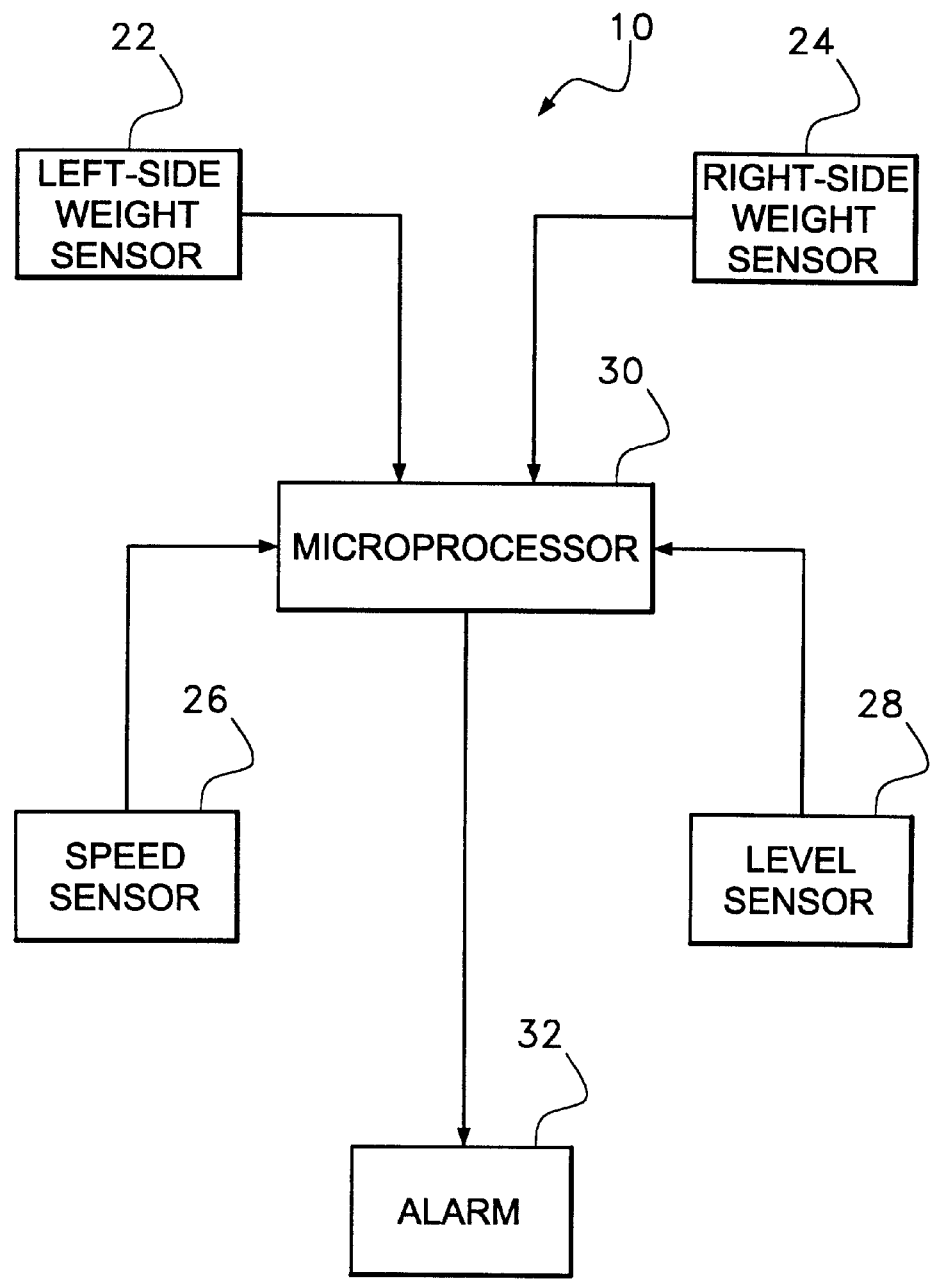
FIG. 7 is a schematic block diagram of an exemplary tip over monitoring system in accordance with the present invention.

Referring to FIG. 7, a schematic of a system 20 is shown in accordance with the present invention. The system 20 includes at least one left side weight sensor 22 and at least one right side weight sensor 24. These sensors can be located on the frame of the trailer, the suspension of the trailer or the axles of the trailer. These sensors detect weight distribution in the trailer.

A speed sensor 26 is also provided. The speed sensor 26 connects to the transmission or engine computer of the truck pulling the trailer and detects the speed at which the trailer is being pulled.

Optionally, at least one level sensor 28 is also provided. The level sensor 28 can be connected to various points on either the trailer or the truck pulling the trailer. Preferably, the level sensors are connected to points on either the truck or the trailer whose level would remain mostly unaffected by the cargo load distribution in the trailer. For example, the level sensors 28 can be placed on the axles of the trailer. The axles remain parallel to the road regardless of the load distribution within the trailer.

The left side weight sensors 22, the right side weight sensors 24, the speed sensor 26 and the level sensors 28 are all connected to a common microprocessor 30. The microprocessor 30 monitors the left/right weight distribution and the rate of change in the weight distributions. The microprocessor 30 also calculates the alarm threshold values depending upon the speed of the trailer and the level of the road. If the microprocessor 30 detects an alarm condition, the microprocessor 30 sounds an alarm 32. The alarm 32 would be located in the cab of the truck pulling the trailer so that the driver can heed the alarm 32 and take corrective measures.

The present invention system 20 warns a driver of load shifts as well as potentially dangerous trailer conditions. As such, a driver has the ability to be warned of a tip over condition while there is still time to correct the situation. The present invention system is especially useful with younger drivers who may not have the experience to anticipate changes in driving performance due to shifting cargo loads.

Certain trucks, such as flatbed tractor trailers carry many different types of loads. Often the load is a shipping container that has an unknown weight distribution. Flatbed trailers are also used to haul large oversized items such as concrete forms, framing trusses and the like. The present invention system can be manufactured into the structure of a tractor trailer. However, the present invention system can also be added to an existing tractor trailer, should it become apparent that the tractor trailer will be hauling a large or unbalanced load. For example, if a flat bed tractor trailer is going to be used to haul large concrete forms, weight sensors can be added to the suspension elements of the tractor trailer. Furthermore, level sensors can be added to the axles of the tractor trailer and all sensors can be attached to a portable computer that is placed in the driving cab. As such, the system will be able to warn of tip over conditions in any tractor trailer. Once the oversized load is removed, the present invention system can also be removed.

It will be understood that the specifics of the present invention described above illustrate only exemplary embodiments of the present invention. A person skilled in the art can therefore make numerous alterations and modifications to the shown embodiments utilizing functionally equivalent components to those shown and described. For example, the present invention system and method can easily be adapted to tanker trucks and smaller trucks that have unistructurally formed trailers and cabs. All such modifications are intended to be included within the scope of the present invention as defined by the appended claims.

What is claimed is:

1. A system for warning of a tip over condition in a motor vehicle carrying a cargo load, wherein the motor vehicle has a left side and a right side, said system comprising:

at least one left side sensor for sensing a proportion of the cargo load carried on the left side of the motor vehicle;

at least one right side sensor for sensing a proportion of the cargo load carried on the right side of the motor vehicle;

a microprocessor coupled to said at least one left side sensor and said at least one right side sensor, wherein said microprocessor calculates a ratio of the cargo load borne by the left side of the motor vehicle and the right side of the motor vehicle, calculates a rate of change for said ratio over a period of time, and compares said rate of change to a threshold rate of change value, an alarm coupled to said microprocessor, wherein said microprocessor sounds said alarm when said rate of change exceeds said threshold rate of change.

2. The system according to claim 1, wherein motor vehicle is a tractor trailer and said at least one left side sensor and said at least one right side sensor sense the cargo load in a trailer section of the tractor trailer.

3. The system according to claim 1, further including a speed sensor, coupled to said microprocessor for detecting the speed of the motor vehicle.

4. The system according to claim 3, wherein said threshold rate of change is calculated by said microprocessor as a function of the speed of said motor vehicle.

5. The system according to claim 1, further including at lest one level sensor, coupled to said microprocessor, for detecting the levelness of said motor vehicle.

6. The system according to claim 5, wherein said threshold rate of change is calculated by said microprocessor as a function of the levelness of said motor vehicle.

7. A method of indicating to the driver of a tractor trailer that the trailer is in danger of tipping over, said method comprising the steps of:

sensing a portion of weight borne by the left side of the trailer;

sensing a portion of weight borne by the right side of the trailer;

calculating a ratio between the weight borne by the left side of the vehicle as compared to the weight borne by the right side of the vehicle;

determining rates of change in said ratio over a predetermined period time comparing said rates of change to a threshold rate of change; and providing an alarm indication to the driver if any of said rates of change exceeds said threshold rate of change.

8. The method according to claim 7, further including the step of monitoring the speed at which the trailer is traveling.

9. The method according to claim 8, further including the step of calculating said threshold rate of change as a function of the speed at which the trailer is traveling.

10. The method according to claim 9, further including the step of monitoring the levelness of the surface upon which the trailer is traveling.

11. The method according to claim 10, further including the step of calculating said threshold rate of change as a function of the levelness of the surface upon which the trailer is traveling.

* * * * *